(12) United States Patent
Colby

(10) Patent No.: X4030
(45) Date of Patent: Feb. 16, 1825

(54) STOVE PIPE, MANUFACTURING

(76) Inventor: John Colby

John Colby

Letters Patent

The schedule referred to in these Letters Patent, and making part of the same con-
taining a description in the words of the said John Colby [illegible] of his im-
provement in the manufacturing of Stove pipe.

A bench with two parallel rollers with gudgeons at each end of them, which gud-
geons are supported on wood and iron arms extending from each end of the bench for
that purpose the inner roller is supported by the wooden, and the outside roll-
er by the iron arms. to the outside roller is fastened a curved steel plate ex-
tending from end to end with a curve of a depth sufficient to admit the edge
of the sheet that is to be made into pipe far enough to form a clench; to one
end of this roller is affixed a large cog wheel which matches to a small
cog wheel, that is perforated by, and fastened to, a shaft which shaft plays
in iron clasps that are fastened to a bench, to one end of the shaft is affixed a
crank by which the machine is worked.

The iron arms are so affixed to the bench, that they may
be extended or withdrawn, as occasion may require the iron arm that supports
the ends of the roller to which a wheel is affixed is jointed that it may be
removed off the gudgeon in order to take from the roller the pipe when formed
the end of the roller is then supported by a rest projecting from the under
part of the bench. To this end of the roller at a distance of one and one half an
inch from the end of the curved steel plate is affixed a circular projection of
iron one quarter of an inch which matches to a circular crease in the in-
ner roller made for that purpose End.

Witnesses
Benj^n H Sewall
[illegible] Houston

John Colby

M.G.

DRAFTSMAN'S DIVISION.

*All communications should be addressed to*
"The Commissioner of Patents,
Washington, D. C."

2—328 *a.*

*DEPARTMENT OF THE INTERIOR,*

United States Patent Office,

*Washington, D. C.,* ............................, *189*...

*SIR:*

*The printed* ........copies........ *of Patent No* Colby
........are........ *exhausted.* Feb 16 1825

*As soon as printed a copy will be mailed you to complete your order.*

..............................................................................

..............................................................................

*By direction of the Commissioner:*

*Very respectfully,*

..............................................................................

*Chief Clerk.*

..............................................................................

..............................................................................

..............................................................................

8143b6-97-5m